United States Patent
Lee et al.

(10) Patent No.: US 11,569,523 B2
(45) Date of Patent: Jan. 31, 2023

(54) POLYMER ELECTROLYTE MEMBRANE FOR MEDIUM AND HIGH TEMPERATURE, PREPARATION METHOD THEREOF AND HIGH TEMPERATURE POLYMER ELECTROLYTE MEMBRANE FUEL CELL COMPRISING THE SAME

(71) Applicant: KOREA INSTITUTE OF SCIENCE AND TECHNOLOGY, Seoul (KR)

(72) Inventors: So Young Lee, Seoul (KR); Seung Ju Lee, Seoul (KR); Min Jae Lee, Seoul (KR); Hyun Seo Park, Seoul (KR); Jong Hyun Jang, Seoul (KR); Hyoung-Juhn Kim, Seoul (KR); Suk Woo Nam, Seoul (KR); Young Suk Jo, Seoul (KR); Yeong Cheon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 102 days.

(21) Appl. No.: 16/859,712

(22) Filed: Apr. 27, 2020

(65) Prior Publication Data
US 2021/0119237 A1  Apr. 22, 2021

(30) Foreign Application Priority Data

Oct. 16, 2019 (KR) .................. 10-2019-0128609
Dec. 24, 2019 (KR) .................. 10-2019-0173763

(51) Int. Cl.
*H01M 8/1051* (2016.01)
*H01M 8/103* (2016.01)
(Continued)

(52) U.S. Cl.
CPC ......... *H01M 8/1051* (2013.01); *H01M 8/103* (2013.01); *H01M 8/1011* (2013.01);
(Continued)

(58) Field of Classification Search
None
See application file for complete search history.

(56) References Cited

U.S. PATENT DOCUMENTS

2007/0238000 A1* 10/2007 Koyama ............ H01M 8/1032
429/483

FOREIGN PATENT DOCUMENTS

KR  101052340 B1  7/2011

OTHER PUBLICATIONS

Shakshooki, S.K., "Nano Fibrous Cerium (IV) Hydrogen Phosphate Membrane Self Supported Indole Polymerization Agent," J. Chem. Chem. Eng. 8 (2014), 378-384.*
Daniel Teichmann et al., "A future energy supply based on Liquid Organic Hydrogen Carriers (LOHC)", Energy & Environmental Science, 2011, 4, pp. 2767-2773.
JuYeon Lee et al., "Effect of Membrane Electrode Assembly Fabrication Method on the Single Cell Performances of Polybenzimidazole-Based High Temperature Polymer Electrolyte Membrane Fuel Cells",
(Continued)

*Primary Examiner* — Jonathan Crepeau
(74) *Attorney, Agent, or Firm* — Rabin & Berdo, P.C.

(57) ABSTRACT

The present disclosure relates to a polymer electrolyte membrane for medium and high temperature, a preparation method thereof and a high-temperature polymer electrolyte membrane fuel cell including the same, more particularly to a technology of preparing a composite membrane including an inorganic phosphate nanofiber incorporated into a phosphoric acid-doped polybenzimidazole (PBI) polymer membrane by adding an inorganic precursor capable of forming a nanofiber in a phosphoric acid solution when preparing phosphoric acid-doped polybenzimidazole and using the same as a high-temperature polymer electrolyte membrane which is thermally stable even at high temperatures of 200-300° C. without degradation of phosphoric acid and has high ion conductivity.

14 Claims, 7 Drawing Sheets

(51) Int. Cl.
H01M 8/1072 (2016.01)
H01M 8/1081 (2016.01)
H01M 8/1048 (2016.01)
H01M 8/1088 (2016.01)
H01M 8/1011 (2016.01)
H01M 8/10 (2016.01)
H01M 8/1009 (2016.01)

(52) U.S. Cl.
CPC ....... *H01M 8/1013* (2013.01); *H01M 8/1048* (2013.01); *H01M 8/1072* (2013.01); *H01M 8/1081* (2013.01); *H01M 8/1088* (2013.01); H01M 8/1009 (2013.01); H01M 2008/1095 (2013.01); H01M 2250/20 (2013.01); H01M 2300/0068 (2013.01); H01M 2300/0082 (2013.01); H01M 2300/0091 (2013.01)

(56) References Cited

OTHER PUBLICATIONS

Macromolecular Research, vol. 22, No. 11, 2014, pp. 1214-1220.
Kwan-Soo Lee et al., "An operationally flexible fuel cell based on quaternary ammonium-biphosphate ion pairs", Nature Energy, 2016, pp. 1-12.
Kwan-Soo Lee et al., "Intermediate Temperature Fuel Cells via an Ion-Pair Coordinated Polymer Electrolyte", Energy & Environmental Science, 2018, pp. 1-9.
Patrick Preuster et al., "Liquid Organic Hydrogen Carriers (LOHCs): Toward a Hydrogen-free Hydrogen Economy", Accounts of Chemical Research, 2017, 50, pp. 74-85.

* cited by examiner (1) Process of preparing phosphoric acid-based fuel cell electrolyte membrane by impregnation method (2) Process of preparing in-situ phosphoric acid-based fuel cell electrolyte membrane

POLYMER ELECTROLYTE MEMBRANE FOR MEDIUM AND HIGH TEMPERATURE, PREPARATION METHOD THEREOF AND HIGH TEMPERATURE POLYMER ELECTROLYTE MEMBRANE FUEL CELL COMPRISING THE SAME

CROSS-REFERENCE TO RELATED APPLICATIONS

This application claims, under 35 U.S.C. § 119, the priority of Korean Patent Application Nos. 10-2019-0128609 and 10-2019-0173763 filed on Oct. 16, 2019 and Dec. 24, 2019, respectively in the Korean Intellectual Property Office, the disclosure of which is incorporated herein by reference in its entirety.

TECHNICAL FIELD

The present disclosure relates to a polymer electrolyte membrane for medium and high temperature, a preparation method thereof and a high-temperature polymer electrolyte membrane fuel cell including the same, more particularly to a technology of preparing a composite membrane including an inorganic phosphate nanofiber incorporated into a phosphoric acid-doped polybenzimidazole (PBI) polymer membrane by adding an inorganic precursor capable of forming a nanofiber in a phosphoric acid solution when preparing phosphoric acid-doped polybenzimidazole and using the same as a high-temperature polymer electrolyte membrane which is thermally stable even at high temperatures of 200-300° C. without degradation of phosphoric acid and has high ion conductivity.

BACKGROUND

With fossil fuel depletion, rapid climate change and high risk of nuclear power generation, interests are increasing in future energy systems based on renewable energy sources. However, since the inflow of energy such as wind power or solar heat is intermittent and difficult to expect, an energy storage system (ESS) capable of maintaining balance between the changing energy demand and intermittent supply is necessary (non-patent document 1).

For stable use and supply of renewable energy with high production variability, large-scale storage of surplus energy and long-range transportation should be possible. Hydrogen is drawing attentions as a promising renewable energy carrier. But, due to low volumetric storage density, hydrogen makes economical large-scale storage and long-range transportation difficult. The methods for hydrogen storage developed thus far include compression under high temperature ($CGH_2$; compressed gaseous hydrogen) and storage as liquefied hydrogen ($LH_2$; Liquid hydrogen). However, there are problems of relatively low density or maintenance of low temperature. In order to overcome this problem, the compound-hydrogen storage technology using chemical reactions is emerging as a new solution. In particular, chemical hydrogen storage through reversible catalytic (de)hydrogenation reaction of liquid organic hydrogen carriers (LOHC) is the newest promising hydrogen storage technology. The LOHC technology is widely applicable from household energy supply to grid stabilization and load leveling since it enables convenient and safe energy storage for a long time and the current gasoline infrastructure can be utilized as it is.

Recently, a power generation system which converts the chemical energy of hydrogen contained in an LOHC material directly into electrical energy by directly connecting an LOHC reactor with a fuel cell is being studied. Since LOHC dehydrogenation nonmetal catalysts react usually at 250-300° C., the development of a fuel cell system which exhibits high energy density at medium and high temperatures and is easy to handle is required (non-patent document 2).

A molten carbonate fuel cells (MCFC) and a solid oxide fuel cell (SOFC) which are operated mainly at high temperatures are difficult to be used as direct LOHC fuel cells because the fuel cell performance is very low at operating temperatures of 250-300° C. A phosphoric acid fuel cell (PAFC), which can be operated at 200° C., is limited in applications because it is applicable only to stationary power stations and is difficult to be downsized due to corrosion by liquid electrolytes during operation.

However, a high-temperature proton exchange membrane fuel cell (HT-PEMFC) using a phosphoric acid-doped polybenzimidazole (PBI) electrolyte membrane, which can be operated at high operating temperatures of 100-200° C., is a clean and effective energy conversion device that can be used as a mobile or stationary power source due to the advantages of high energy density, low corrosivity and easy handling. It exhibits a peak power density of about 500-800 m/$cm^2$ in $H_2$/air. The operating temperature of the HT-PEMFC is limited due to loss of phosphoric acid occurring when the fuel cell is exposed to water of 140° C. or lower or it is operated at 200° C. High-temperature fuel cells such as a protonic ceramic fuel cell (PCFC) operating at –350° C. or a solid oxide fuel cell (SOFC) operating at 800° C. achieve power densities of 2000 mW $cm^{-2}$ and 1400 mW $cm^{-2}$ at 700° C. But, the fuel cell performance at low temperature is low as 100 mW $cm^{-2}$ at 350° C. An intermediate-temperature fuel cell (ITFC) exhibits high fuel cell performance at intermediate (200-300° C.) operating temperature unlike the high-temperature fuel cell (350° C. or higher). When compared with the fuel cells operating at low temperature, the ITFC is advantageous in that toxicity due to reaction impurities such as carbon monoxide or sulfur dioxide is low and problems related with liquid components such as water treatment, acid leakage and electrode flooding can be minimized. And, when compared with the fuel cells operating at high temperature, the ITFC allows a wide variety of material options and compact stack designs. Therefore, it also provides a way to cost reduction also in solid fuel cell systems for high temperature.

The inventors of the present disclosure have prepared a composite membrane including an inorganic phosphate nanofiber incorporated into a phosphoric acid-doped polybenzimidazole polymer membrane by adding an inorganic precursor capable of forming a nanofiber in a phosphoric acid solution when preparing phosphoric acid-doped polybenzimidazole and have completed the present disclosure by identifying that it can be used as a high-temperature polymer electrolyte membrane which is thermally stable even at high temperatures of 200-300° C. without degradation of phosphoric acid and has high ion conductivity.

REFERENCES OF THE RELATED ART

Non-Patent Documents

Non-patent document 1. Teichmann, Daniel, et al. *Energy & Environmental Science* 4.8 (2011): 2767-2773.

Non-patent document 2. Preuster, Patrick, Christian Papp, and Peter Wasserscheid. *Accounts of Chemical Research* 50.1 (2016): 74-85.

SUMMARY

The present disclosure is directed to preparing a composite membrane including an inorganic phosphate nanofiber incorporated into a phosphoric acid-doped polybenzimidazole polymer membrane by adding an inorganic precursor capable of forming a nanofiber in a phosphoric acid solution when preparing phosphoric acid-doped polybenzimidazole and using the same as a high-temperature polymer electrolyte membrane which is thermally stable even at high temperatures of 200-300° C. without degradation of phosphoric acid and has high ion conductivity.

In an aspect, the present disclosure relates to a composite membrane including: a phosphoric acid-doped polybenzimidazole polymer membrane; and a nanofiber incorporated into the polymer membrane, wherein the nanofiber contains one or more phosphate selected from cerium phosphate and thorium phosphate.

In another aspect, the present disclosure relates to a high-temperature polymer electrolyte membrane including the composite membrane according to the present disclosure.

In another aspect, the present disclosure relates to a membrane electrode assembly for a fuel cell, which includes the high-temperature polymer electrolyte membrane according to the present disclosure.

In another aspect, the present disclosure relates to a fuel cell system including the membrane electrode assembly according to the present disclosure.

The fuel cell may be a direct liquid organic hydrogen carrier (LOHC) fuel cell.

The liquid organic hydrogen carrier may be one or more selected from: a $C_1$-$C_3$ organic compound including methanol ($CH_3OH$), dimethyl ether ($C_2H_6O$) and 2-propanol ($C_3H_8O$); a $C_4$ or higher organic compound including N-ethylcarbazole (NEC), biphenyl, diphenylmethane, methylcyclohexane (MCH) and dibenzyltoluene (DBT); and an inorganic compound including ammonia ($NH_3$), nitrohydrazine ($N_2H_4$), hydrazine borane ($N_2H_4BH_3$) and ammonia borane ($NH_3BH_3$).

In another aspect, the present disclosure relates to an electrical device including the fuel cell system according to the present disclosure, wherein the electrical device is one or more selected from an electric vehicle, a hybrid electric vehicle, a plug-in hybrid electric vehicle, an electric boat, an electric train, an aircraft, an unmanned aircraft, an electric power motor, a stationary power generator, a mobile power generator and a power storage device.

In another aspect, the present disclosure relates to a method for preparing a composite membrane, which includes: (a) a step of mixing a phosphoric acid-doped PBI polymer solution and a precursor solution of an inorganic precursor dissolved in phosphoric acid; and (b) a step of forming the resulting mixture into a membrane, wherein the inorganic precursor is one or more selected from cerium phosphate and thorium phosphate.

According to the present disclosure, a composite membrane may be prepared by adding an inorganic precursor capable of forming a nanofiber in a phosphoric acid solution when preparing phosphoric acid-doped polybenzimidazole, and it can be used as a high-temperature polymer electrolyte membrane which is thermally stable even at high temperatures of 200-300° C. without degradation of phosphoric acid and has high ion conductivity

DETAILED DESCRIPTION OF EMBODIMENTS

Figure 1A:
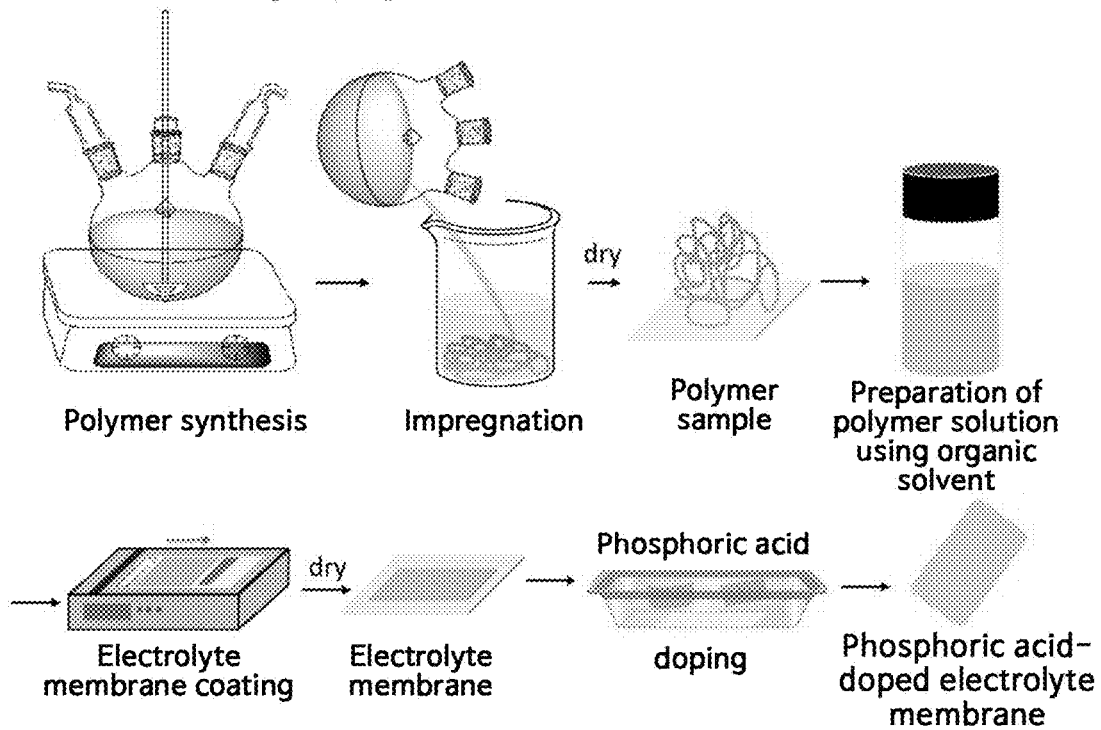
FIG. 1A schematically shows (1) a process of preparing a phosphoric acid-based fuel cell electrolyte membrane by impregnation method and (2) a process of preparing an in-situ phosphoric acid-based fuel cell electrolyte membrane according to existing methods, and FIG. 1B schematically shows a process of preparing a high-temperature polymer electrolyte membrane according to Example 1 of the present disclosure.
Figure 1A:
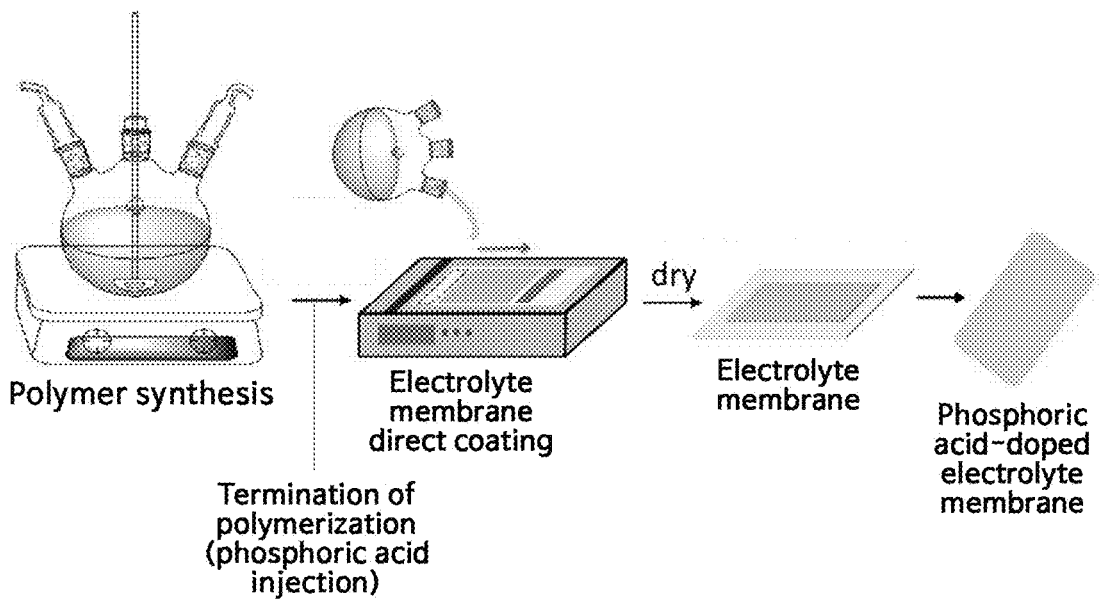

Hereinafter, various aspects and exemplary embodiments of the present disclosure are described in more detail.

An aspect of the present disclosure relates to a composite membrane including: a phosphoric acid-doped polybenzimidazole (PBI) polymer membrane; and a nanofiber incorporated into the polymer membrane, wherein the nanofiber contains one or more phosphate selected from cerium phosphate and thorium phosphate. Specifically, the nanofiber may be a cerium phosphate nanofiber.

For the phosphoric acid-doped PBI polymer membrane, as the existing electrolyte membrane for a high-temperature polymer electrolyte membrane fuel cell, the highest temperature at which performance could be evaluated was 150° C. [Lee, JuYeon, et al. *Macromolecular Research* 22.11 (2014): 1214-1220.]. In contrast, the composite membrane according to the present disclosure can exhibit thermal stability even at high temperatures of 200-300° C. without degradation of phosphoric acid and high ion conductivity, as compared to the existing polymer electrolyte membrane which undergoes severe degradation at temperatures above 200° C., since it contains cerium phosphate or thorium phosphate in the form of a solid acid nanofiber in the phosphoric acid-doped PBI polymer membrane.

Also, a technology of preparing a $SnP_2O_7$-Nafion polymer membrane using a $SnP_2O_7$ powder and using the same at 200° C. or above was reported [Lee, Kwan-Soo, et al. Energy & Environmental Science 11.4 (2018): 979-987.]. This technology allows operation at higher temperature than the polymer electrolyte membrane by forming an ion pair with phosphoric acid using an anion-based binder in an electrode. In contrast, the present disclosure is advantageous in that operation is possible even at 200° C. or higher using a commonly used polytetrafluoroethylene (PTFE) binder electrode even without an anion-based binder for forming an ion pair during electrode preparation.

Also, there is a technology of forming an ion pair between phosphoric acid and a quaternary ammonium group by doping phosphoric acid into a QAPOH (quaternary ammonium-biphosphate ion pair-coordinated polyphenylene) membrane, so that operation is possible up to 180° C., higher than the binding energy between PBI and phosphoric acid, for a long time without leakage of phosphoric acid [Lee, Kwan-Soo, et al. Nature Energy 1.9 (2016): 16120.]. However, this technology is applicable to low-humidity conditions rather than non-humidified conditions, whereas the fuel cell of the present disclosure can be operated under hydrogen/air conditions up to 250° C. and under non-humidified conditions.

In an exemplary embodiment, the polybenzimidazole (PBI) may be p-polybenzimidazole (p-PBI), m-polybenzimidazole (m-PBI) or poly(2,5-benzimidazole) (ABPBI), specifically p-polybenzimidazole (p-PBI).

In another exemplary embodiment, the cerium phosphate nanofiber may have a chemical formula of $Ce_2(PO_4)_2$ $HPO_4.nH_2O$. It may be specifically $Ce(PO_4)_2HPO_4.H_2O$, $Ce_2(PO_4)_2HPO_4.2.9H_2O$, $Ce_2(HPO_4)_3$ or $CeP_3O_9$, more specifically $Ce(PO_4)_2HPO_4.H_2O$.

In addition, the thorium phosphate nanofiber may have a chemical formula of $Th_2(PO_4)_2HPO_4.H_2O$ or $Th_4(PO_4)_4$ $P_2O_7$.

In another exemplary embodiment, the one or more selected from cerium phosphate and thorium phosphate may be contained in an amount of 1-99 wt %, specifically 10-90 wt %, more specifically 20-60 wt %, further more specifically 30-40 wt %, based on of the phosphoric acid-doped PBI. If the content of cerium phosphate is 10-90 wt %, remarkably superior fuel cell performance can be achieved at high temperature as compared to when the content is outside the range.

Another aspect of the present disclosure relates to a high-temperature polymer electrolyte membrane including the composite membrane according to the present disclosure.

Another aspect of the present disclosure relates to a membrane electrode assembly for a fuel cell including the high-temperature polymer electrolyte membrane according to the present disclosure.

Another aspect of the present disclosure relates to a fuel cell system including the membrane electrode assembly according to the present disclosure.

At present, a direct liquid organic hydrogen carrier (LOHC) fuel cell, which is a power generation system that converts the chemical energy of hydrogen contained in an LOHC material directly into electrical energy by directly connecting an LOHC reactor with a fuel cell is being studied. Since LOHC dehydrogenation nonmetal catalysts react usually at 250-300° C., the development of a fuel cell system which exhibits high energy density at medium and high temperatures and is easy to handle is required [Preuster, Patrick, Christian Papp, and Peter Wasserscheid. Accounts of Chemical Research 50.1 (2016): 74-85.]. Accordingly, the high-temperature polymer electrolyte membrane according to the present disclosure may be an electrolyte membrane that can be applied to a direct LOHC fuel cell system.

The liquid organic hydrogen carrier may be one or more selected from: a $C_1$-$C_3$ organic compound including methanol ($CH_3OH$), dimethyl ether ($C_2H_6O$) and 2-propanol ($C_3H_8O$); a $C_4$ or higher organic compound including N-ethylcarbazole (NEC), biphenyl, diphenylmethane, methylcyclohexane (MCH) and dibenzyltoluene (DBT); and an inorganic compound including ammonia ($NH_3$), nitrohydrazine ($N_2H_4$), hydrazine borane ($N_2H_4BH_3$) and ammonia borane ($NH_3BH_3$).

In addition, the liquid organic hydrogen carrier (LOHC) may be a liquid hydrogen carrier in the form of a liquid or a gas. In particular, when methanol is used as the liquid organic hydrogen carrier, it may be a mixture gas including $CO_2$, CO and $H_2O$. When a $C_4$ or higher organic compound is used as the liquid organic hydrogen carrier, it may be a mixture gas including a cyclic alkene containing a C=C double bond.

Another aspect of the present disclosure relates to an electrical device including the fuel cell system according to the present disclosure, wherein the electrical device is one or more selected from an electric vehicle, a hybrid electric vehicle, a plug-in hybrid electric vehicle, an electric boat, an electric train, an aircraft, an unmanned aircraft, an electric power motor, a stationary power generator, a mobile power generator and a power storage device.

Another aspect of the present disclosure relates to a method for preparing a composite membrane, which includes: (a) a step of mixing a phosphoric acid-doped PBI polymer solution and a precursor solution of an inorganic precursor dissolved in phosphoric acid; and (b) a step of forming the resulting mixture into a membrane, wherein the inorganic precursor is one or more selected from cerium phosphate and thorium phosphate.

In general, the existing composite membrane is prepared through a two-step process of preparing a polymer first and then preparing a membrane by dissolving the same in a solvent and mixing with a composite material. In contrast, according to the present disclosure, the composite membrane wherein a solid acid nanofiber is incorporated into a polymer membrane can be synthesized through a simple one-step process by adding one or more inorganic precursor selected from cerium phosphate and thorium phosphate in the final stage of in-situ phosphoric acid-doped PBI polymer synthesis.

In addition, due to the addition of the inorganic precursor, which leads to bonding between the phosphoric acid-doped PBI and the phosphate nanofiber of the inorganic precursor, thermal stability can be achieved not only at high temperatures (200-300° C.) but also under non-humidified conditions and high ion conductivity can be achieved as compared to the existing phosphoric acid-doped PBI. A high-temperature polymer electrolyte membrane fuel cell using the same can have improved performance as compared to the existing high-temperature polymer electrolyte membrane fuel cell due to increased catalytic activity and ion conductivity resulting from elevated operating temperature.

As a specific example, in the step (a), a composite membrane wherein a solid acid nanofiber is incorporated into a polymer membrane may be formed by adding a cerium(IV) precursor in the final stage of in-situ phosphoric acid-doped PBI polymer synthesis. Cerium(IV), together with thorium(IV), is a material which forms a phosphate of a nanofiber structure. A cerium phosphate nanofiber having a nanofiber structure may be synthesized by reacting a cerium(IV) salt solution with a hot phosphoric acid solution (150-300° C.) under constant stirring. In addition, the size, shape and thickness of [$PO_4$/Ce(IV)] may be determined depending on Ce content and synthesis temperature and time.

In an exemplary embodiment, the polybenzimidazole (PBI) may be p-polybenzimidazole (p-PBI), m-polybenzimidazole (m-PBI) or poly(2,5-benzimidazole) (ABPBI). Specifically, it may be p-polybenzimidazole (p-PBI).

In another exemplary embodiment, the PBI polymer solution may be synthesized by reacting 3,3-diaminobenzidine, terephthalic acid and polyphosphoric acid at 100-400° C. under inert gas atmosphere and adding phosphoric acid when the reaction solution becomes viscous.

Specifically, the 3,3'-diaminobenzidine, the terephthalic acid, the polyphosphoric acid and the phosphoric acid may be mixed at a weight ratio of 1:0.4-1:35-50:10-20, more specifically at a weight ratio of 1:0.6-0.9:38-45:12-18, further more specifically at a weight ratio of 1:0.7-0.8:40-43:14-16.

The inert gas atmosphere may be an atmosphere where an inert gas selected from argon, nitrogen, neon, helium and a mixture gas of two or more thereof is applied, although not being limited thereto. More specifically, argon gas may be used.

During the synthesis of the PBI polymer solution, reaction may be conducted by (i) a step of stirring for 10-30 hours at a first heat-treating temperature of 100-190° C. and (ii) a step of stirring for 20-100 minutes at a second heat-treating temperature of 195-300° C. More specifically, the stirring in the step (i) may be performed for 12-20 hours at a first heat-treating temperature of 120-180° C. and the stirring in the step (ii) may be performed for 30-90 minutes at a second heat-treating temperature of 200-280° C. Further more specifically, the stirring in the step (i) may be performed for 13-16 hours at a first heat-treating temperature of 140-160° C. and the stirring in the step (ii) may be performed for 40-70 minutes at a second heat-treating temperature of 210-240° C.

The synthesis reaction may be terminated by adding the phosphoric acid. After the reaction is completed, the synthesized PBI polymer may be dissolved in phosphoric acid by stirring for 30 minutes to 2 hours, more specifically for 50-70 minutes.

In another exemplary embodiment, the precursor solution may be a cerium precursor solution dissolved in phosphoric acid and, in the cerium precursor solution dissolved in phosphoric acid, the phosphoric acid and the cerium precursor may be mixed at a weight ratio of 1:0.01-0.09, specifically 1:0.02-0.07, more specifically 1:0.03-0.05.

In the step (a), after adding the inorganic precursor dissolved in phosphoric acid to the phosphoric acid-doped PBI polymer solution in a dropwise manner, mixing may be conducted by stirring at 150-300° C., specifically 180-250° C., more specifically 200-220° C., for 1-24 hours, more specifically 2-10 hours, further more specifically 3-4 hours. The inorganic precursor may be specifically a cerium precursor, more specifically cerium sulfate or cerium nitrate, further more specifically cerium(IV) sulfate tetrahydrate.

In another exemplary embodiment, the inorganic precursor may be mixed in an amount of 1-99 wt %, specifically 10-90 wt %, more specifically 20-60 wt %, further more specifically 30-40 wt %, based on the phosphoric acid-doped PBI. When the content of the cerium precursor is 10-90 wt %, remarkably superior fuel cell performance can be achieved at high temperature as compared to when the content is outside the range.

Then, in the step (b), a composite membrane is formed by casting the mixture of the step (a) onto a substrate and then hydrolyzing the cast membrane under humidified condition. The hydrolysis in the step (b) may be performed at 30-100° C., specifically 40-80° C., more specifically 45-55° C., under relative humidity (RH) of 50-100%, specifically 60-90%, more specifically 75-85%, for 10-48 hours, specifically 15-35 hours, more specifically 20-28 hours.

Specifically, in the step (b), the composite membrane connected by the phosphate nanofiber of the inorganic precursor is formed through sol-gel reaction under the temperature and relative humidity conditions. More specifically, $H_2PO_4^-$ and $SO_3^-$ are removed through hydrolysis of the phosphoric acid injected to terminate the reaction for preparation of the inorganic precursor-incorporated PBI and PPA, and the composite membrane connected by the phosphate nanofiber of the inorganic precursor may be formed finally through hydrogen bonding of the produced $H_2O$ molecules.

In particular, although not clearly described in the following examples, comparative examples, etc., the torsional strength of the composite membranes prepared with different inorganic precursors while varying the PBI polymer solution synthesis condition, the weight ratio of the phosphoric acid and the inorganic precursor, the weight ratio of the inorganic precursor to the PBI, and the condition of membrane formation was measured, and the outer surface roughness was investigated by scanning electron microscopy (SEM).

As a result, the composite membrane was not broken at all after 1,000 cycles of torsional strength measurement, the initial outer surface roughness was very smooth and no change in outer surface roughness or loss of the cerium phosphate nanofiber formed in the PBI membrane was observed after 1,000 cycles of torsional strength measurement when all of the following conditions were satisfied: (i) PBI polymer solution is synthesized by reacting 3,3'-diaminobenzidine, terephthalic acid and polyphosphoric acid at 100-400° C. under inert gas atmosphere and adding phosphoric acid when the reaction solution becomes viscous, (ii) the 3,3'-diaminobenzidine, the terephthalic acid, the polyphosphoric acid and the phosphoric acid are mixed at a weight ratio of 1:0.4-1:35-50:10-20, (iii) the inert gas is argon gas, (iv) the reaction is conducted by (1) a step of stirring at a first heat-treating temperature of 100-190° C. for 10-30 hours and (2) a step of stirring at a second heat-treating temperature of 195-300° C. for 20-100 minutes, (v) the precursor solution is a cerium precursor solution dissolved in phosphoric acid, (vi) in the cerium precursor solution dissolved in phosphoric acid, the phosphoric acid and the cerium precursor are mixed at a weight ratio of 1:0.01-0.09, (vii) the cerium precursor is cerium sulfate tetrahydrate, (viii) the cerium precursor is mixed in an amount of 10-90 wt % based on the PBI, (ix) the step (a) is performed by mixing at 150-300° C., (x) in the step (b), a composite membrane is formed by casting the mixture of the step (a) onto a substrate and then hydrolyzing the cast membrane under humidified condition, (xi) the hydrolysis in the step (b) is performed at 30-100° C. under relative humidity of 50-100% RH for 10-48 hours. But, when any one of the above conditions was not satisfied, the composite membrane was broken after 1,000 cycles of torsional strength measurement and significant change in outer surface roughness and remarkable loss of the cerium phosphate nanofiber were observed.

Hereinafter, preparation examples and examples according to the present disclosure are described in detail referring to the attached drawings.

PREPARATION EXAMPLE 1

Preparation of Catalyst Slurry Containing PTFE and Anode Electrode 46.2% Pt/C (1.5 g), distilled water (9.5 g), isopropyl alcohol (23.2 g) and polytetrafluoroethylene (PTFE, 0.54 g) were added to a reactor and dispersed for 10 minutes by tip sonication. Then, a catalyst slurry was prepared by conducting dispersion for 1 hour using a homogenizer. An electrode was prepared by coating the prepared catalyst slurry on a gas diffusion layer (GDL) by auto-spray to a Pt content of 0.5 mg/cm$^2$. Finally, an anode electrode was prepared by heat-treating the prepared electrode for 2 hours at 350° C. under argon atmosphere.

EXAMPLE 1

Preparation Ce-Added p-polybenzimidazole (p-PBI) Composite Membrane

Figure 1B:
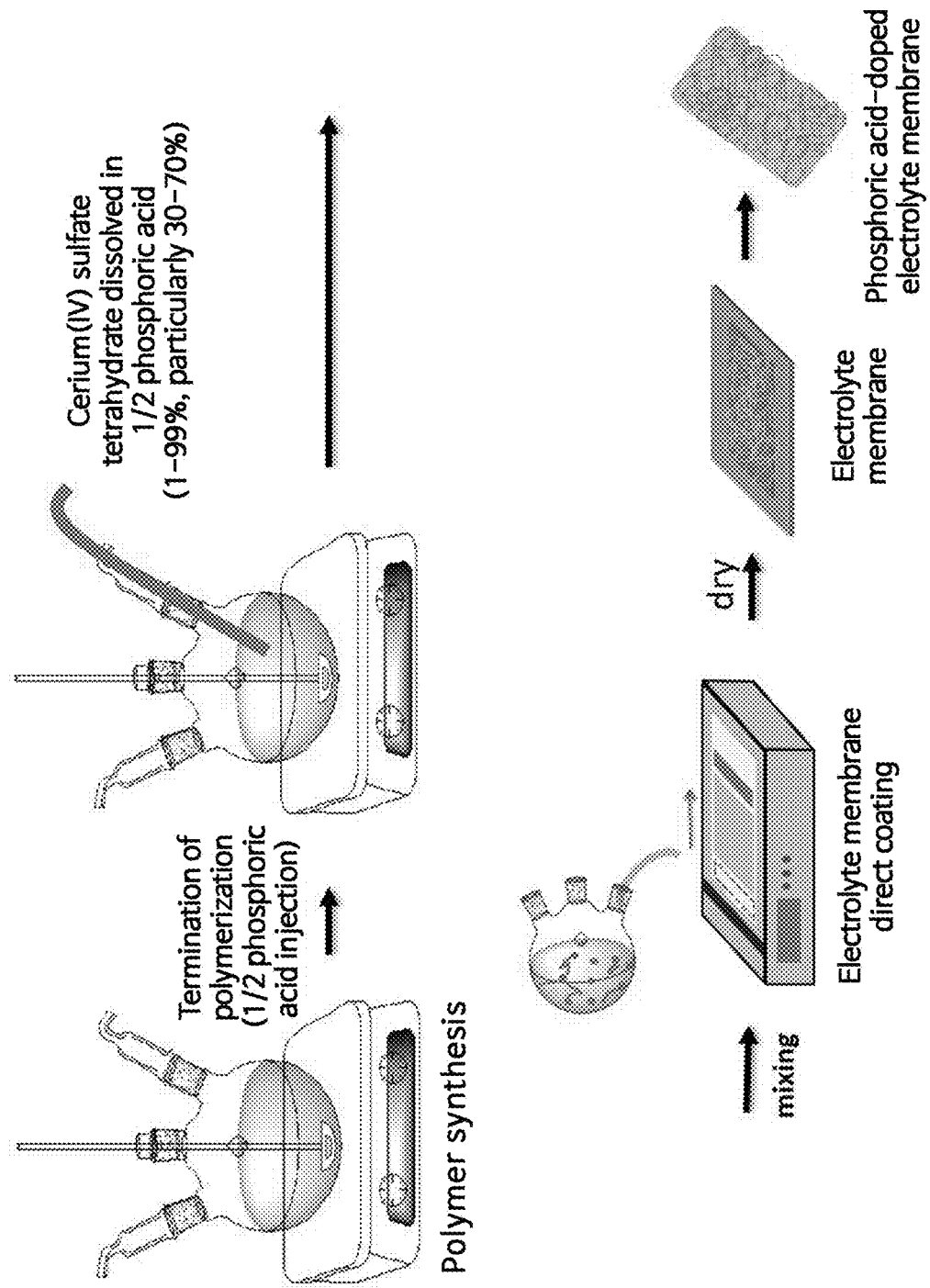

Dried 3.3'-diaminobenzidine (3 g), terephthalic acid (2.3497 g) and polyphosphoric acid (125 g) were added to a round-bottom flask and stirred at 150° C. for 15 hours under argon atmosphere. Then, while stirring at 220° C. for 40-70 minutes, the reaction (synthesis of phosphoric acid-doped p-PBI) was terminated by adding 25 mL of phosphoric acid when an adequate viscosity (toque: 5) was reached. Then, after dissolving the phosphoric acid-doped p-PBI polymer in phosphoric acid while further stirring the phosphoric acid-doped p-PBI synthesis solution for 1 hour, 1.8724 g of cerium(IV) sulfate tetrahydrate dissolved in 25 mL of phosphoric acid (35 wt % based on the synthesized phosphoric acid-doped p-PBI) was further added in a drop-wise manner and then mixed by stirring at 200-220° C. for 3-4 hours. Then, the polymer mixture was poured onto a glass plate and cast using a doctor blade. A Ce-added p-PBI (poly[2,2'(p-phenylene)-5,5'-bibenzimidazole]) membrane was prepared as a high-temperature polymer electrolyte membrane by hydrolyzing the cast polymer in a humidified chamber at 50° C. for 24 hours under relative humidity of 80% RH (see FIG. 1B, FIGS. 3A and 3B). The cerium phosphate nanofiber incorporated into the high-temperature polymer electrolyte membrane was identified as $Ce(PO_4)_2 \cdot HPO_4 \cdot H_2O$.

EXAMPLE 2

Preparation of Membrane Electrode Assembly

The high-temperature polymer electrolyte membrane prepared in Example 1 was heat-treated in an oven at 130° C. for 30 minutes. Then, after injecting a 1:6 mixture solution of phosphoric acid and ethanol onto the surface of a cathode electrode (Pt content: 0.6 mg/cm$^2$, commercially available from BASF) using a brush, heat treatment was performed in an oven at 130° C. for 1 hour. A membrane electrode assembly was prepared with the anode electrode prepared in Preparation Example 1 and the heat-treated electrolyte membrane and cathode electrode together with Teflon and Kapton gaskets.

COMPARATIVE EXAMPLE 1

Preparation of Phosphoric Acid-Doped polybenzimidazole (p-PBI) Membrane

A polymer electrolyte membrane was prepared in the same manner as in Example 1, but excluding the addition of the cerium sulfate tetrahydrate dissolved in phosphoric acid, by casting a p-PBI synthesis solution obtained by reacting dried 3.3'-diaminobenzidine (3 g), terephthalic acid (2.3497 g) and polyphosphoric acid (125 g) and terminating the reaction by adding 25 mL of phosphoric acid onto a glass plate.

COMPARATIVE EXAMPLE 2

Preparation of Membrane Electrode Assembly

A membrane electrode assembly was prepared in the same manner as in Example 2, using the polymer electrolyte membrane of Comparative Example 1 instead of Example 1.

Figure 2A:
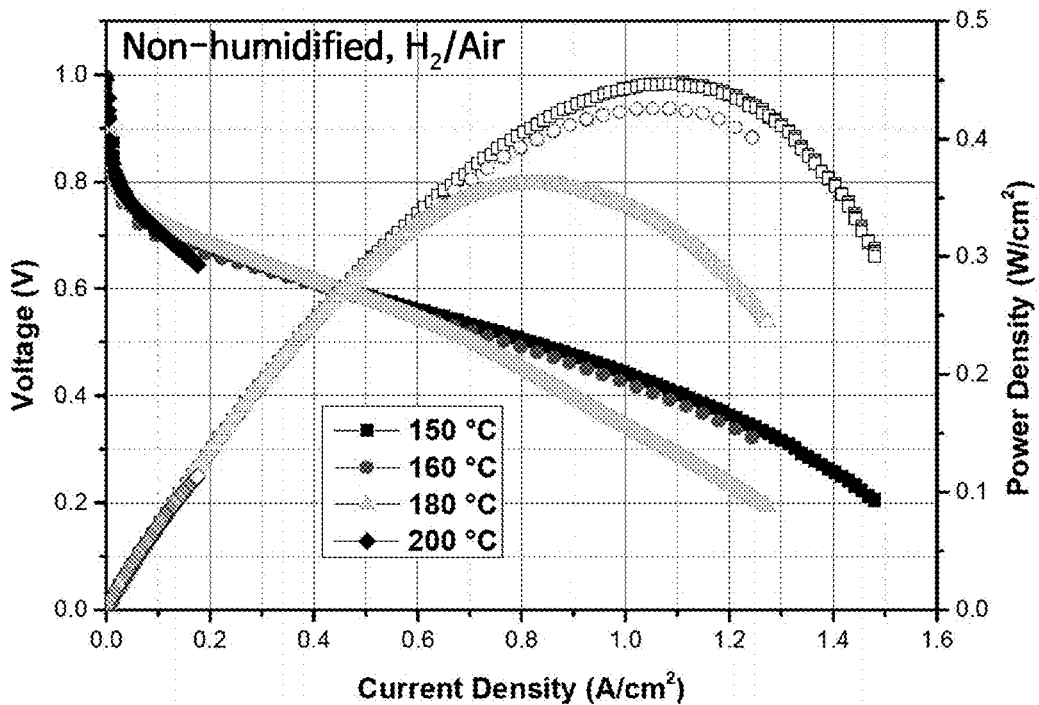
FIGS. 2A and 2B, respectively, show the current density of a membrane electrode assembly (MEA) including an existing phosphoric acid-doped p-polybenzimidazole (p-PBI) polymer electrolyte membrane prepared in Comparative Example 2 and a membrane electrode assembly including a Ce-added p-PBI high-temperature polymer electrolyte membrane prepared in Example 2 depending on temperature.
Figure 2B:
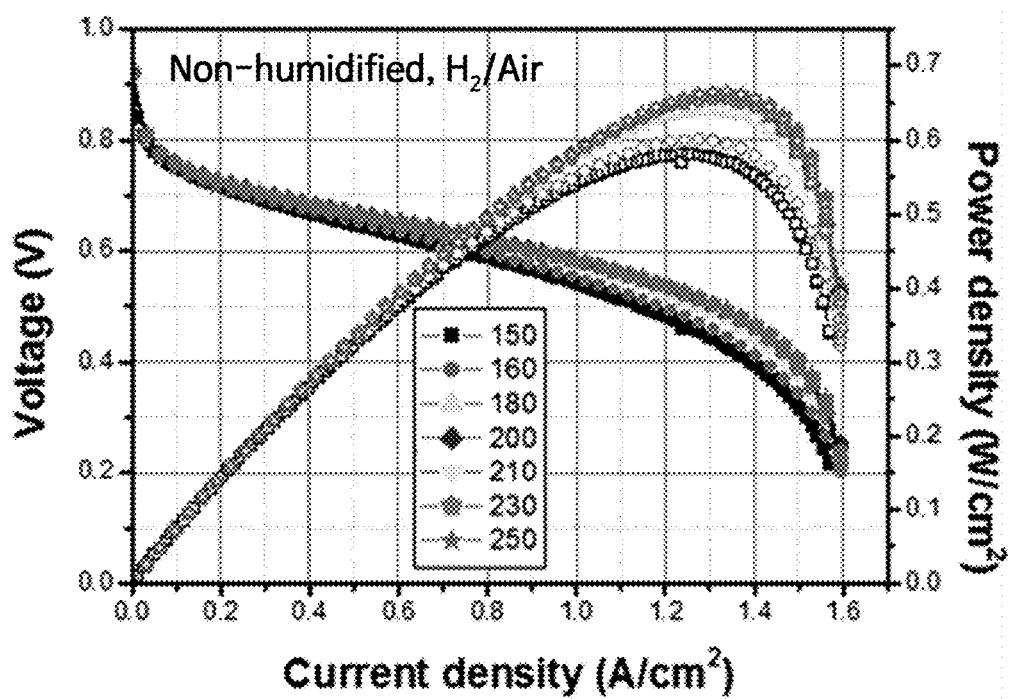

FIGS. 2A and 2B, respectively, show the current density of the membrane electrode assembly (MEA) including the existing phosphoric acid-doped p-polybenzimidazole (p-PBI) polymer electrolyte membrane prepared in Comparative Example 2 and the membrane electrode assembly including the Ce-added p-PBI high-temperature polymer electrolyte membrane prepared in Example 2 depending on temperature.

Referring to FIGS. 2A and 2B, whereas the evaluation of the MEA was possible for the phosphoric acid-doped p-PBI polymer electrolyte membrane up to about 150-180° C. only due to the degradation of phosphoric acid (FIG. 2A), the membrane electrode assembly including the Ce-added p-polybenzimidazole (p-PBI) high-temperature polymer electrolyte membrane according to the present disclosure showed current density of 380 mA/cm$^2$ or higher at 0.7 V and about 1000 mA/cm$^2$ at 0.6 V, at 200° C. or above (FIG. 2B). The remarkable effect of the present disclosure can be confirmed when considering that the existing polymer electrolyte membrane fuel cell does not show such performance at 200° C. or above.

Figure 3A:
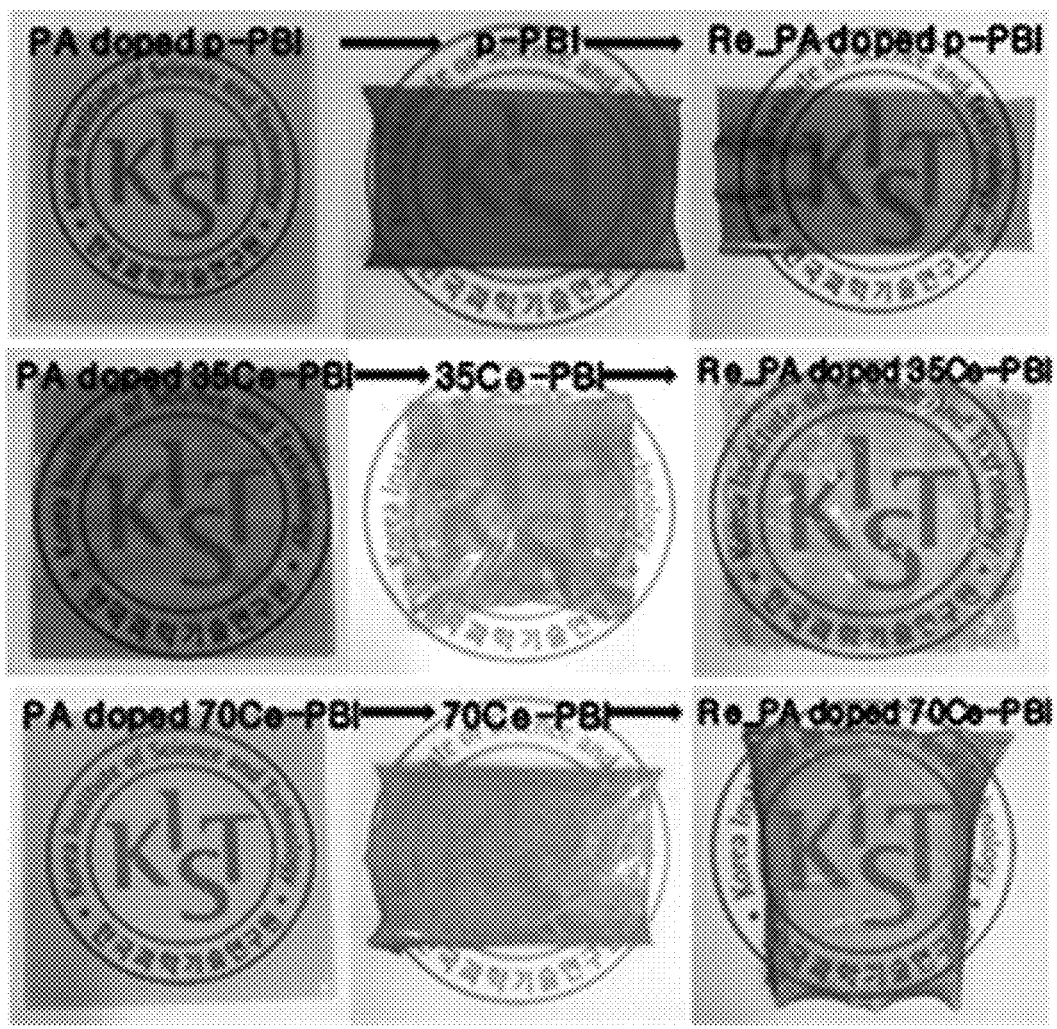
FIGS. 3A and 3B, respectively, show photographic images of polymer electrolyte membranes prepared in Example 1 and Comparative Example 1 and scanning electron microscopic (SEM) images of the surface of polymer electrolyte membranes prepared in Example 1 and Comparative Example 1 [(a): phosphoric acid-doped polymer electrolyte membrane (PA-doped p-PBI), polymer electrolyte membrane with the doped phosphoric acid removed (p-PBI) and phosphoric acid-redoped polymer electrolyte membrane (Re_PA-doped p-PBI), horizontally; content (wt %) of Ce added, vertically].
Figure 3B:
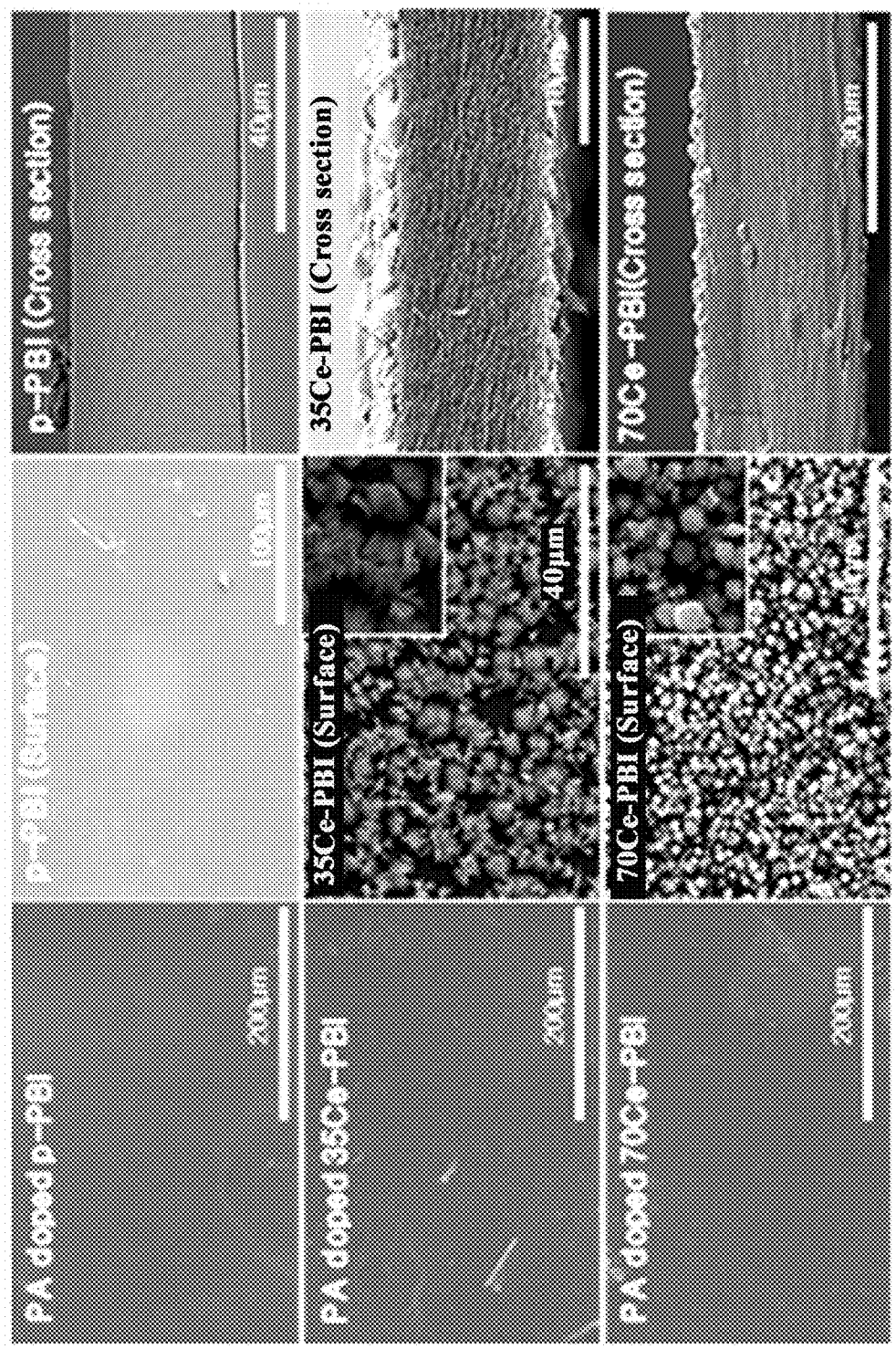

FIGS. 3A and 3B, respectively, show the photographic images of the polymer electrolyte membranes prepared in Example 1 and Comparative Example 1 and the scanning electron microscopic (SEM) images of the surface of the polymer electrolyte membranes prepared in Example 1 and Comparative Example 1 [(a): phosphoric acid-doped polymer electrolyte membrane (PA-doped p-PBI), polymer electrolyte membrane with the doped phosphoric acid removed (p-PBI) and phosphoric acid-redoped polymer electrolyte membrane (Re_PA-doped p-PBI), horizontally; content (wt %) of Ce added, vertically].

Referring to FIGS. 3A and 3B, whereas the existing phosphoric acid-doped p-PBI polymer electrolyte membrane showed no significant change in the photographic images and scanning electron microscopic (SEM) analysis data before and after the removal of phosphoric acid, the polymer electrolyte membrane including the Ce-added p-polybenzimidazole (p-PBI) membrane according to the present disclosure turned opaque due to formation of the cerium phosphate nanofiber after the removal of phosphoric acid and the scanning electron microscopic (SEM) analysis data revealed the formation of the nanofiber. It was found out that the size and thickness of the nanofiber vary depending on the Ce content. In addition, it was confirmed that, after reimpregnation in phosphoric acid, the cerium phosphate nanofiber formed in the PBI membrane was not lost and the membrane became transparent again.

Figure 4A:
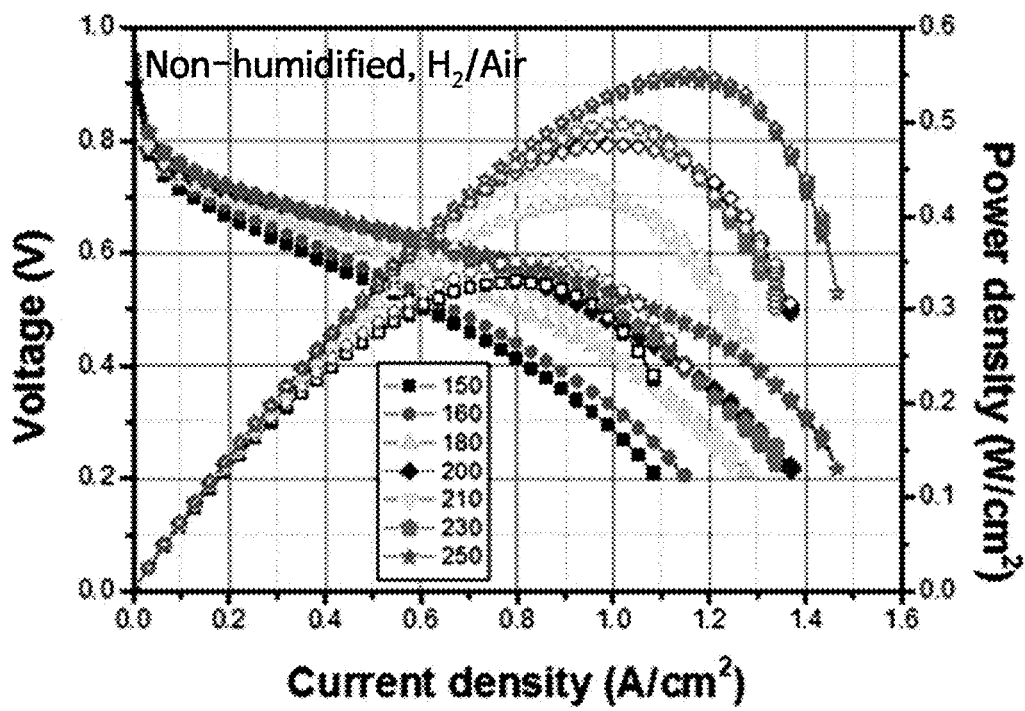
FIGS. 4A and 4B, respectively, show the current density of a membrane electrode assembly including a membrane obtained by removing phosphoric acid (PA) from a Ce-added p-polybenzimidazole (p-PBI) membrane prepared in Example 1 and then impregnating it again with phosphoric acid depending on temperature and the voltage at a constant current of 1.568 A at 250° C. after the experiment of FIG. 4A.
Figure 4B:
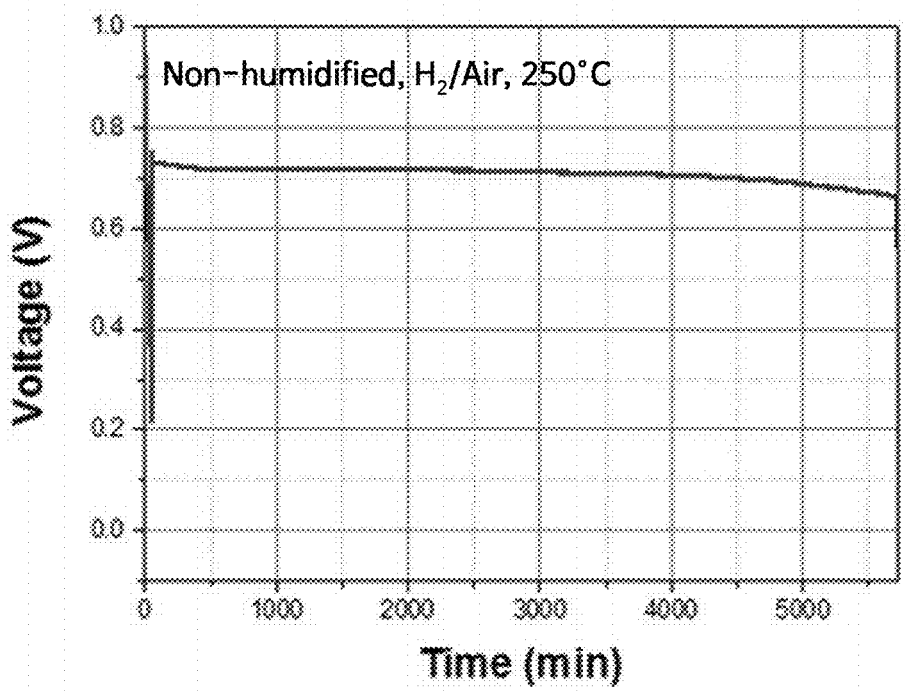

FIGS. 4A and 4B, respectively, show the current density of the membrane electrode assembly including the membrane obtained by removing phosphoric acid (PA) from the Ce-added p-polybenzimidazole (p-PBI) membrane prepared in Example 1 and then impregnating it again with phosphoric acid depending on temperature and (b) the voltage at a constant current of 1.568 A at 250° C. after the experiment of FIG. 4A.

Referring to FIGS. 4A and 4B, it can be seen that the Ce-added p-polybenzimidazole (p-PBI) membrane exhibits high performance unlike the existing phosphoric acid-doped p-PBI polymer electrolyte membrane even when it is reimpregnated (redoping) after the doped phosphoric acid is removed. In addition, the loss of the cerium phosphate nanofiber formed in the PBI membrane did not occur even after the redoping of phosphoric acid and at high temperature. Although there may be difference in performance depending on the redoping level of phosphoric acid, long-term operation is possible at 250° C. for 5500 minutes. Such superior thermal stability has never been achieved with the existing technology.

A polymer electrolyte membrane with rigid polymer chains can be prepared by adding the cerium precursor during the preparation of phosphoric acid-doped p-PBI, since the cerium phosphate nanofiber is incorporated into the phosphoric acid-doped p-PBI. As a result, the thermal stability and ion conductivity of the polymer electrolyte membrane are improved and very superior performance can be achieved even at high temperature.

Figure 5:
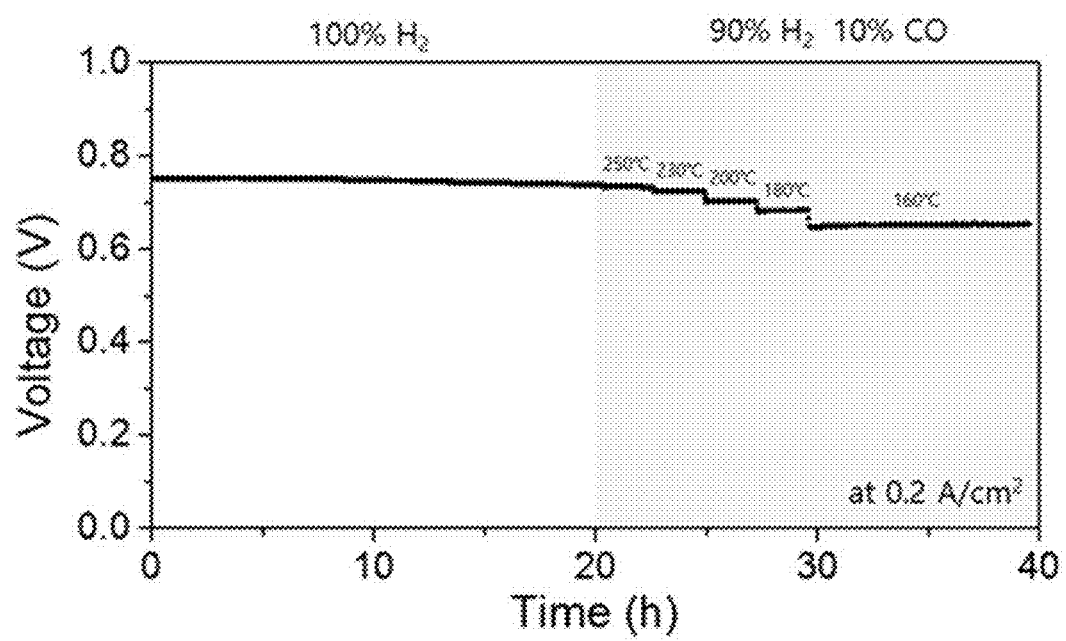
FIG. 5 shows the change of the voltage of a membrane electrode assembly prepared in Example 2 depending on time (100% $H_2$, 90% $H_2$+10% CO, at 0.2 A/cm$^2$).

FIG. 5 shows the change of the voltage of the membrane electrode assembly prepared in Example 2 depending on time (100% $H_2$, 90% $H_2$+10% CO, at 0.2 $A/cm^2$), as the experimental result of investigating whether a fuel cell including the membrane electrode assembly according to the present disclosure can be applied to a liquid organic hydrogen carrier fuel cell system. As seen from FIG. 5, high performance is maintained without significant change in voltage at various temperatures, despite the relatively high CO content of 10% or higher. Accordingly, it is expected that the fuel cell is applicable to various electrical devices using liquid organic hydrogen carrier fuel cell systems.

What is claimed is:

1. A high-temperature polymer electrolyte membrane which is thermally stable at high temperatures of 200-300° C. without degradation of phosphoric acid, comprising a composite membrane comprising:
   a phosphoric acid-doped polybenzimidazole (PBI) polymer membrane; and
   a cerium phosphate nanofiber incorporated into the polymer membrane.

2. A membrane electrode assembly for a fuel cell, comprising the high-temperature polymer electrolyte membrane according to claim 1.

3. A fuel cell system comprising the membrane electrode assembly according to claim 2.

4. The fuel cell system according to claim 3, wherein the fuel cell is a direct liquid organic hydrogen carrier (LOHC) fuel cell.

5. The fuel cell system according to claim 4, wherein the liquid organic hydrogen carrier is one or more selected from: a $C_1$-$C_3$ organic compound comprising methanol ($CH_3OH$), dimethyl ether ($C_2H_6O$) and 2-propanol ($C_3H_8O$); a $C_4$ or higher organic compound comprising N-ethylcarbazole (NEC), biphenyl, diphenylmethane, methylcyclohexane (MCH) and dibenzyltoluene (DBT); and an inorganic compound comprising ammonia ($NH_3$), nitrohydrazine ($N_2H_4$), hydrazine borane ($N_2H_4BH_3$) and ammonia borane ($NH_3BH_3$).

6. An electrical device comprising the fuel cell system according to claim 4, wherein the electrical device is one or more selected from an electric vehicle, a hybrid electric vehicle, a plug-in hybrid electric vehicle, an electric boat, electric train, an aircraft, an unmanned aircraft, an electric power motor, a stationary power generator, a mobile power generator and a power storage device.

7. A method for preparing the composite membrane according to claim 1, comprising:
   (a) mixing a phosphoric acid-doped PBI polymer solution and a precursor solution of a cerium precursor dissolved in phosphoric acid; and
   (b) forming the resulting mixture into a membrane.

8. The method for preparing a composite membrane according to claim 7, wherein the phosphoric acid-doped PBI polymer solution is synthesized by reacting 3,3'-diaminobenzidine, terephthalic acid and polyphosphoric acid at 100-400° C. under inert gas atmosphere and adding phosphoric acid when the reaction solution becomes viscous.

9. The method for preparing a composite membrane according to claim 7, wherein
   the precursor solution is a cerium precursor solution dissolved in phosphoric acid, and,
   in the cerium precursor solution dissolved in phosphoric acid, the phosphoric acid and the cerium precursor are mixed weight ratio of 1:0.01-0.09.

10. The method for preparing a composite membrane according to claim 7, wherein 1-99 wt % of the inorganic precursor is mixed based on the phosphoric acid-doped PBI polymer.

11. The method for preparing a composite membrane according to claim 7, wherein, the mixing in (a) is performed at 150-300° C.

12. The method for preparing a composite membrane according to claim 7, wherein, in (b), a composite membrane is formed by casting the mixture of (a) onto a substrate and then hydrolyzing the cast membrane under humidified condition.

13. The method for preparing a composite membrane according to claim 12, wherein the hydrolysis in (b) is performed at 30-100° C. under relative humidity of 50-100% RH for 10-48 hours.

14. The method for preparing a composite membrane according to claim 7, wherein
   the PBI polymer solution is synthesized by reacting 3,3'-diaminobenzidine, terephthalic acid and polyphosphoric acid at 100-400° C. under inert gas atmosphere and adding phosphoric acid when the reaction solution becomes viscous,
   the 3,3'-diaminobenzidine, the terephthalic acid, the polyphosphoric acid and the phosphoric acid are mixed at a weight ratio of 1:0.4-1:35-50:10-20,
   the inert gas is argon gas,
   the reaction is conducted by (i) stirring for 10-30 hours at a first heat-treating temperature of 100-190° C. and (ii) stirring for 20-100 minutes at a second heat-treating temperature of 195-300° C.,
   the precursor solution is a cerium precursor solution dissolved in phosphoric acid, in the cerium precursor solution dissolved in phosphoric acid, the phosphoric acid and the cerium precursor are mixed at a weight ratio of 1:0.01-0.09, the cerium precursor is cerium sulfate tetrahydrate, the cerium precursor is mixed in an amount of 10-90 wt % based on the PBI, (a) is performed by mixing at 150-300° C., in (b), a composite membrane is formed by casting the mixture of (a) onto a substrate and then hydrolyzing the cast membrane under humidified condition, and the hydrolysis in (b) is performed at 30-100° C. under relative humidity of 50-100% RH for 10-48 hours.

\* \* \* \* \*